United States Patent Office 3,420,844
Patented Jan. 7, 1969

3,420,844
PYRROLE-2-CARBOXAMIDO-PROPIONAMIDINES
Federico Arcamone, Sergio Penco, and Vincenzo Nicolella, Milan, Italy, assignors to Società Farmaceutici Italia, Milan, Italy, a corporation of Italy
No Drawing. Filed July 22, 1964, Ser. No. 384,515
Claims priority, application Italy, July 26, 1963, 15,701/63
U.S. Cl. 260—326.3     11 Claims
Int. Cl. C07d 27/26; A01n 9/22

The invention relates to new pyrrole derivatives which have proved useful in agriculture and in therapy and which have the following general organic structural skeleton:

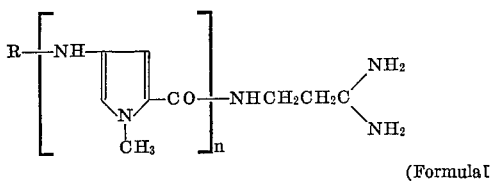

(Formula I)

wherein R is a hydrogen atom or an acyl radical of an aliphatic, cyclo-aliphatic or aromatic carboxylic acid with 1 to 10 carbon atoms, and $n=2$ or 3, and their non-toxic organic or inorganic acid addition salts, and to a process for their preparation.

The starting materials for the preparation of the new compounds of the invention are the pyrrole derivatives having the following general formula:

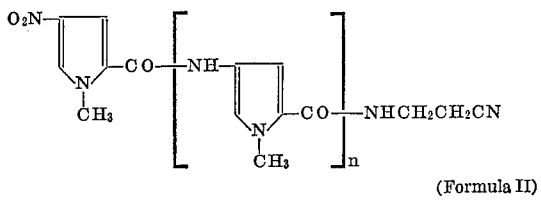

(Formula II)

wherein $n=1$ or 2.

β-[1 - methyl - 4 - (1 - methyl - 4 - nitro - pyrrole - 2-carboxamido) - pyrrole - 2 - carboxamido] - propionitrile (Formula II, $n=1$), which has not yet been described in literature, may be prepared as follows: 1-methyl-4-nitro-pyrrole-2-carboxylic acid is converted into its chloride by treatment with thionyl chloride and then condensed with β-amino-propionitrile to give β-(1-methyl-4-nitro-pyrrole-2-carboxamido)-propionitrile. This last substance is first catalytically hydrogenated to β-(1-methyl-4-amino-pyrrole-2-carboxamido)-propionitrile, and then condensed with 1-methyl-4-nitro-pyrrole-2-carboxylic acid chloride to give the desired starting material (Formula II, $n=1$).

β - {1 - methyl - 4 - [1 - methyl - 4 - (1 - methyl - 4-nitro - pyrrole - 2 - carboxamido) - pyrrole - 2 - carboxamido] - pyrrole - 2 - carboxamido} - propionitrile (Formula II, $n=2$), which has not yet been described in literature, may be prepared as follows: β-[1-methyl-4-(1-methyl - 4 - nitro - pyrrole - 2 - carboxamido) - pyrrole-2-carboxamido]-propionitrile (Formula II, $n=1$) is first hydrogenated to β-[1-methyl-4-(1-methyl-4-amino-pyrrole-2 - carboxamido) - pyrrole - 2 - carboxamido] - propionitrile and then condensed with 1-methyl-4-nitro-pyrrole-2-carboxylic acid chloride to give the desired starting material (Formula II, $n=2$).

The invention includes a process of preparing the new compounds of the invention which comprises subjecting a compound having the Formula II herein to alcoholysis in the presence of hydrogen chloride, aminating the resulting imino-ether hydrochloride, catalytically hydrogenating the resulting amidine hydrochloride, and where appropriate acylating and/or isolating as a free base or acid addition salt.

According to the preferred way of carrying out the process of the invention, a starting material having the Formula II is reacted with an anhydrous lower aliphatic alcohol, for example methanol or ethanol, in the presence of anhydrous gaseous hydrogen chloride and at about 0° C. When the reaction is over the solvents are evaporated so obtaining a residue, wherein the corresponding imino-ether hydrochloride having the following formula:

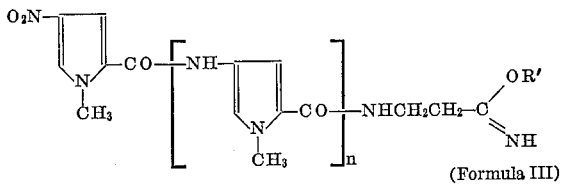

(Formula III)

wherein $n=1$ or 2, and R'=a lower alkyl group, is present. The imino-ether hydrochloride having the Formula III, in pure or crude form, is reacted with anhydrous gaseous ammonia in an anhydrous lower aliphatic alcohol, for example methanol or ethanol, at about 0° C. The reaction is preferably completed at room temperature. The product which separates from the reaction mixture, as the corresponding amidine hydrochloride, has the following formula:

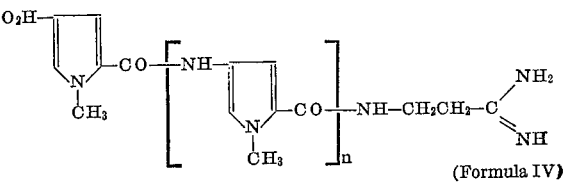

(Formula IV)

wherein $n=1$ or 2. The amidine hydrochloride having the Formula IV, either dissolved or suspended in a solvent such as water, dilute aqueous acetic or hydrochloric acid and a lower aliphatic alcohol, for example methanol or ethanol, is hydrogenated at room temperature and under atmospheric pressure, in the presence of a 5%–10% palladium on charcoal or platinum dioxide catalyst.

The resulting product having the Formula I (wherein R=H), which may be isolated either as a free base or as a salt, may be acylated with the anhydride or the chloride or a mixed anhydride or ester of an aliphatic, cyclo-aliphatic or aromatic carboxylic acid having from 1 to 10 carbon atoms, optionally in the presence of a tertiary amine, for example, pyridine, triethylamine or dimethylaniline. Typical acyl derivatives are the formate, acetate, propionate, valerate, decanoate, β-cyclopentyl-propionate, benzoate, and β-phenyl-propionate.

The final products having the Formula I may be converted into the corresponding non-toxic organic and inorganic acid addition salts, for example hydrochlorides, sulphates, phosphates, acetates, maleates, ascorbates, succinates, benzoates, or salicylates.

The new compounds of the invention show interesting biological properties which make them useful both in agriculture and veterinary therapy. They show antifungal properties against the bean "rust," caused by *Uromyces appendiculatus*, against carnation "rust" caused by *Uromyces dianthi* against pear scab caused by *Fusicladium pirinum*, and against *Cercospora beticola* and *l'Alternaria tenuis*. They are repellent to rodents and birds as is demonstrated by offering to these animals feed containing one or more of the new compounds of the invention when it may be observed that the animals practically refuse to feed. This property is very useful for preserving seed and other articles from the attack of birds and rodents. For employment as antifungals, the new compounds of the invention may be used in admixture with an inert solid or liquid vehicle, for example powders or solutions, and spread or sprayed or sprinkled on the vegetables to be protected.

The new compounds of the invention may be used in veterinary therapy as antifungal, tripanocidal, antiprotozoal, bactericidal, antiviral and antitumoral agents. They show a surprising activity in interfering with the reproductive processes of pathogenic virus, and they protect animal tissue cells from viral infections, without showing symptoms of toxicity. They show interesting cytostatic properties towards cells of tumeral tissue by blocking the process of cell cleavage both "in vitro" and "in vivo," as shown by tests carried out on different species of experimental tumour in the mouse. For use is veterinary therapy, the compositions of the invention comprise one or more of the new compounds of the invention with a therapeutically acceptable solid or liquid vehicle (diluent or carrier), according to the manner of administration which may be oral, rectal or parenteral.

The following examples illustrate the invention:

EXAMPLE 1

β-{1-methyl-4-[1-methyl-4-(1-methyl - 4 - amino-pyrrole-2-carboxamido)-pyrrole - 2 - carboxamido]-pyrrole-2-carboxamido}-propionamidine 200 cc. of thionyl chloride are dropped into 100 g. of 1-methyl-4-nitro-pyrrole-2-carboxylic acid prepared as described in J. Amer. Chem. Soc., 1957, 79, 1266. When the addition is over, the reaction mixture is refluxed for one hour. The acid chloride, obtained after complete removal of thionyl chloride in vacuo, is dissolved in 1 litre of benzene and added, with stirring, to a solution of 42 g. of β-amino-propionitrile in 800 cc. of water containing 70.5 g. of sodium bicarbonate. The mixture is stirred at room temperature overnight, then the precipitate is collected and washed with water. The yield is 100 g. of β-(1-methyl-4-nitro-pyrrole-2-carboxamido) - propionitrile, melting at 135–137° C.

$\lambda_{max.}^{CH_3OH} = 240$ mµ $E_{1 cm.}^{1\%} 778$; $\lambda_{max.}^{CH_3OH} = 307$ mµ, $E_{1 cm.}^{1\%} 280$ 8. g. of this β-(1-methyl-4-nitro-pyrrole-2-carboxamido)-propionitrile in 140 cc. of dimethylformamide and 70 cc. of water are hydrogenated at room temperature, under atmospheric pressure, in the presence of 2.7 g. of 10% palladium on charcoal. The solution filtered from the catalyst is diluted three times with water and then treated with 3.4 g. of sodium bicarbonate and with the chloride of 1-methyl-4-nitro-pyrrole-2-carboxylic acid obtained from 5.7 g. of the free acid prepared as described above. The mixture is stirred overnight at room temperature. The yellow product obtained is collected, washed with aqueous sodium bicarbonate solution and with water. β-[1-methyl - 4 - (1-methyl-4-nitro-pyrrole-2-carboxamido)-pyrrole - 2 - carboxamido]-propionitrile (Formula II, $n=1$) crystallises from ethanol and melts at 254–255° C.

Yield: 6.4 g. $\lambda_{max.}^{CH_3OH} 241$ mµ, $E_{1 cm.}^{1\%} 561$; $\lambda_{max.}^{CH_3OH} 284$ mµ, $E_{1 cm.}^{1\%} 650$.

5.9 g. of this β-[1-methyl-4-(1-methyl-4-nitro-pyrrole-2-carboxamido)-pyrrole - 2 - carboxamido]-propionitrile are dissolved in 100 cc. of dimethylformamide, mixed with 50 cc. of water and hydrogenated in the presence of 2 g. of 10% palladium on charcoal at room temperature and under atmospheric pressure. The solution filtered from the catalyst is treated with 3.5 g. of the chloride of 1-methyl-4-nitro-pyrrole-2-carboxylic acid prepared as described above to yield 6.3 g. of β-{1-methyl-4-[1-methyl-4-(1-methyl-4-nitro-pyrrole - 2 - carboxamido)-pyrrole-2-carboxamido]-pyrrole - 2 - carboxamido}-propionamide (Formula II, $n=2$), which recrystallized from dimethylformamide and water, melts at 270° C. (with decomposition).

4 g. of this product are suspended in 160 cc. of absolute ethanol and a current of anhydrous hydrogen chloride is bubbled through until saturation is reached. The solution is evaporated to dryness after being kept overnight at 0–5° C. The residue which consists of the corresponding imino-ether (Formula III, $n=2$) is washed with anhydrous diethyl ether, suspended in 50 cc. of absolute ethanol and then mixed with 25 cc. of ammonia saturated with ethanol at 0° C. and saturated with gaseous ammonia, still at 0° C. After being kept at room temperature overnight the product obtained is separated. β-{1-methyl - 4 - [1-methyl-4-(1-methyl-4-nitro-pyrrole-2-carboxamido) - pyrrole - 2 - carboxamido]-pyrrole-2-carboxamido}-propionamidine hydrochloride (Formula IV, $n=2$) crystallises from methanol and melts at 199–207° C.

Yield = 4.2 g. $\lambda_{max.}^{CH_3OH} 240$ mµ, $E_{1 cm.}^{1\%} 520$; $\lambda_{max.}^{CH_3OH} 297$, $E_{1 cm.}^{1\%} 632$.

500 mg. of this last product, suspended in 15 cc. of acetic acid and 1.5 cc. of water are hydrogenated at room temperature and under atmospheric pressure in the presence of 200 mg. of Adams platinum dioxide (PtO₂). The residue is lyophilized and taken up with methanol and diethyl ether. From the organic solution β-{1-methyl-4-[1-methyl-4-(1-methyl-4-amino - pyrrole-2-carboxamido) pyrrole - 2 - carboxamido]-pyrrole-2-carboxamido}-propionamidine (Formula I, $n=3$, R=H) is isolated either as free base or as non-toxic organic and an inorganic acid addition salt.

EXAMPLE 2

Hydrochloride of compound of Example 1

500 mg. of the compound whose preparation is described in Example 1 are treated at 0° C. with 5 cc. of the mixed anhydride of formic and acetic acids (HCOOCOCH₃)

The mixture is kept at 0–5° C. overnight. Then the excess anhydride is decomposed with ice and the mixture is lyophilised. The residue is crystallised from dilute hydrochloric acid. 300 mg. of β-{1-methyl-4-[1-methyl-4-(1-methyl-4-formylamino-pyrrole-2-carboxamido) - pyrrole-2-carboxamido]-pyrrole-2-carboxamido} - propionamidine hydrochloride are obtained. It is a white, hygroscopic substance, melting at 185–189° C.

$\lambda_{max.}^{CH_3OH} 236.5$, $E_{1 cm.}^{1\%} 573$; $\lambda_{max.}^{CH_3OH} 302$, $E_{1 cm.}^{1\%} 694$.

EXAMPLE 3

Acetyl derivative of compound of Example 1

500 mg. of the hydrochloride whose preparation is described in Example 2 are treated with 5 cc. of acetic acid and 5 cc. of acetic anhydride. The mixture is left for 48 hours at room temperature. Then the acetyl derivative is recovered by precipitation from anhydrous diethyl ether. The crude product is purified by chromatography through a neutral alumina column. 180 g. of β-{1-methyl-4-[1-methyl - 4 - (1 - methyl-4-acetylamino-pyrrole-2-carboxamido)-pyrrole-2-carboxamido] - pyrrole-2-carboxamido} propionamidine hydrochloride, melting at 199–205° C. are obtained.

EXAMPLE 4

Cyclo-pentyl propionyl derivative of compound of Example 1

In the same manner as in Example 3 β-{1-methyl-4-[1-methyl - 4 - (1 - methyl - 4 - cyclo-pentyl-propionylamino-pyrrole - 2 - carboxamido) - pyrrole-2-carboxamido]-pyrrole-2-carboxamido}-propionamidine hydrochloride, melting at 186–191° C., is obtained.

EXAMPLE 5

β-[1-methyl - 4 - (1-methyl - 4 - amino-pyrrole-2-carboxamido)-pyrrole-2-carboxamido]-propionamidine Operating as in Example 1, β-[1-methyl-4-(1-methyl-4-nitro-pyrrole - 2 - carboxamido)-pyrrole-2-carboxamido]-propionitrile (Formula II, $n=1$) is dissolved in absolute ethanol and reacted with anhydrous hydrogen chloride gas at 0° C. to obtain the corresponding imino-ether hydrochloride (Formula III, $n=1$). This compound is dissolved in ethanol and reacted with gaseous ammonia at 0° C. and converted into β-[1-methyl-4-(1-methyl-4-nitro-pyrrole - 2 - carboxamido)-pyrrole-2-carboxamido]-propionamidine hydrochloride (Formula IV, $n=1$). This compound is hydrogenated in the presence of Adams platinum dioxide (PtO₂) in aqueous acetic acid and reduced to β-[1-methyl - 4 - (1-methyl - 4 - amino-pyrrole-2-carboxamido) - pyrrole-2-carboxamido] - propionamidine (Formula I, $n=2$, R=H).

What we claim is:

1. A compound selected from the group consisting of the formula

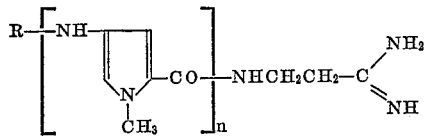

wherein R is selected from the group consisting of hydrogen and an acyl radical taken from the group consisting of alkanoic acid having up to 4 carbon atoms and cyclopentyl propionic acid; n is from 2 to 3; and the non-toxic acid addition salts thereof with an acid selected from the group consisting of hydrochloric, sulphonic, phosphoric, acetic, maleic, ascorbic, succinic, benzoic and salicylic acids.

2. A compound of the formula

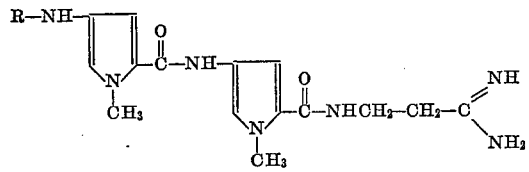

wherein R is a member selected from the group consisting of

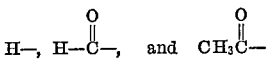

3. A compound selected from the group consisting of β-{1-methyl - 4 - [1-methyl-4-(1-methyl-4-amino-pyrrole-2-carboxamido)-pyrrole - 2 - carboxamido]-pyrrole-2-carboxamido}-propionamidine and its non-toxic acid addition salts thereof with an acid selected from the group consisting of hydrochloric, sulphonic, phosphoric, acetic, maleic, ascorbic, succinic, benzoic and salicylic acids.

4. A compound selected from the group consisting of β-{1-methyl - 4 - [1-methyl-4-(1-methyl-4-formylamino-pyrrole - 2 - carboxamido)-pyrrole-2-carboxamido]-pyrrole - 2 - carboxamido}-propionamidine and its non-toxic acid addition salts thereof with an acid selected from the group consisting of hydrochloric, sulphonic, phosphoric, acetic, maleic, ascorbic, succinic, benzoic and salicylic acids.

5. A compound selected from the group consisting of β-{1 - methyl - 4 - [1 - methyl-4-(1-methyl-4-acetylamino-pyrrole - 2 - carboxamido) - pyrrole-2-carboxamido]-pyrrole - 2 - carboxamido}-propionamidine and its non-toxic acid addition salts thereof with an acid selected from the group consisting of hydrochloric, sulphonic, phosphoric, acetic, maleic, ascorbic, succinic, benzoic and salicylic acids.

6. A compound selected from the group consisting of β-{1-methyl - 4-[1-methyl-4-(1-methyl-4-propionylamino-pyrrole - 2 - carboxamido)-pyrrole-2-carboxamido]-pyrrole - 2 - carboxamido}-propionamidine and its non-toxic acid addition salts thereof with an acid selected from the group consisting of hydrochloric, sulphonic, phosphoric, acetic, maleic, ascorbic, succinic, benzoic and salicylic acids.

7. A compound selected from the group consisting of β-{1-methyl - 4 - [1-methyl-4-(1-methyl-4-β-cyclopentyl-propionylamino-pyrrole - 2 - carboxamido)-pyrrole-2-carboxamido]-pyrrole - 2-carboxamido}-propionamidine and its non-toxic acid addition salts thereof with an acid selected from the group consisting of hydrochloric, sulphonic, phosphoric, acetic, maleic, ascorbic, succinic, benzoic and salicylic acids.

8. A compound selected from the group consisting of β-[1-methyl - 4 - (1-methyl-4-amino-pyrrole - 2 - carboxamido)-pyrrole - 2-carboxamido]-propionamidine and its non-toxic actid addition salts thereof with an acid selected from the group consisting of hydrochloric, sulphonic, phosphoric, acetic, maleic, ascorbic, succinic, benzoic and salicylic acids.

9. A compound selected from the group consisting of β-[1-methyl - 4 - (1-methyl-4-acetylamino-pyrrole-2-carboxamido)-pyrrole - 2-carboxamido]-propionamidine and its non-toxic acid addition salts thereof with an acid selected from the group consisting of hydrochloric, sulphonic, phosphoric, acetic, maleic, ascorbic, succinic, benzoic and salicylic acids.

10. A compound selected from the group consisting of β-[1 - methyl - 4 - (1-methyl-4-propionylamino-pyrrole-2-carboxamido)-pyrrole - 2 - carboxamido]-propionamidine and its non-toxic acid addition salts thereof with an acid selected from the group consisting of hydrochloric, sulphonic, phosphoric, acetic, maleic, ascorbic, succinic, benzoic and salicylic acids.

11. A compound selected from the group consisting of β-[1-methyl - 4-(1-methyl-4-cyclopentyl-propionylamino-pyrrole - 2 - carboxamido)-pyrrole-2-carboxamido]-propionamidine and its non-toxic acid addition salts thereof with an acid selected from the group consisting of hydrochloric, sulphonic, phosphoric, acetic, maleic, ascorbic, succinic, benzoic and salicylic acids.

No references cited.

NICHOLAS S. RIZZO, Primary Examiner.

J. A. NARCAVAGE, Assistant Examiner.

U.S. Cl. X.R.

424—274